Patented Apr. 27, 1954

2,676,933

UNITED STATES PATENT OFFICE 2,676,933

LOW TEMPERATURE COPOLYMERIZATION OF DIOLEFINS, OLEFINS, AND AROMATIC COMPOUNDS

George E. Serniuk, Roselle, and John D. Garber, Cranford, N. J., assignors to Standard Oil Development Company, a corporation of Delaware No Drawing. Application December 2, 1949, Serial No. 130,848

15 Claims. (Cl. 260—23.7)

This invention relates to the manufacture of polymerization products from unsaturated organic materials. More particularly, the present invention relates to a process of preparing resinous masses and to the resins obtainable by said process.

The reaction of conjugated dienes, olefins and aromatic hydrocarbons to form resinous bodies has been known for some time. See, for example, U. S. Patent No. 1,982,707 and No. 2,023,495 to Charles A. Thomas. According to the method disclosed in these references, the resins are prepared by the application of solid aluminum chloride or other solid acid-acting halide catalyst to the hydrocarbon mixture at temperatures of 20° C. or above. However, the product is disclosed as containing a substantial amount of insoluble material.

It has now been found that essentially gel-free (i. e. free from insoluble material) resinous polymers of varying softening point and degree of unsaturation can be prepared in high yields at fairly high catalyst efficiencies from diolefins, open-chain olefins and aromatic compounds free from olefinic unsaturation by effecting the reaction at temperatures below 0° C. using a dissolved Friedel-Crafts type catalyst.

Suitable diolefins include butadiene, isoprene, piperylene, dimethylbutadiene, myrcene, dimethallyl, cyclopentadiene, terpenes, etc. Monoolefins include ethylene, propylene, butene-1, butene-2, isobutylene, amylenes, etc. The aromatic component includes benzene, toluene, xylene, mesitylene, naphthalene, methyl naphthalene, anthracene, phenanthrene hydrindene, tetralin, cyclohexylbenzene and their alkyl, aryl, cycloalkyl, aralkyl, halogen, alkoxy and nitro derivatives such as chlorobenzene, fluorobenzene, halogenated toluene, anisole, phenetole, dimethoxy benzene, halogenated naphthalene, methoxy naphthalene, dimethoxy naphthalene, diphenyl sulfone, diphenyl ether, chlorodiphenyl ether, benzene sulfonyl chloride, benzoyl chloride, etc.

Diolefins, such as butadiene, and olefins, such as butylene, occur in petroleum distillates resulting from high temperature pyrolysis. For example, it is possible to produce a four carbon hydrocarbon fraction by the pyrolysis of Pennsylvania gas oil at 1400° F. with a contact time of 28 seconds and in the presence of 5 per cent of steam. Under these conditions, a weight yield of four carbon hydrocarbons from the charge stock of 10.1% is obtained. The four carbon hydrocarbons consist of 38% butadiene, 38% butylene and 24% unreacted butane. After removal of the butane, such a fraction can be mixed with an aromatic hydrocarbon such as benzene, etc., and polymerized under the conditions described below to produce a resin. However, butadiene may be produced by one of several methods, such as effecting an aldol condensation of acetaldehyde, hydrogenating the product to a glycol and finally dehydrating the glycol to 1,3-butadiene. This diolefin can then be mixed with an olefin, such as amylene, and an aromatic hydrocarbon, such as benzene.

Furthermore, diolefins can be produced by dehydrogenation from the corresponding olefin, for example, butadiene can be produced by the dehydrogenation of normal butylene. In such cases, it is unnecessary to separate the diolefin from the unreacted olefin and the mixture of butadiene and butylene can be employed directly in conjunction with an aromatic hydrocarbon in accordance with this invention.

According to the process of this invention, the three components, i. e. the olefin, diolefin and aromatic hydrocarbon are mixed and cooled to temperatures ranging from 0° C. to —40° or —50° C. to temperatures as low as —100° C. or —150° C. The polymerization reaction is then conducted by the application of a dissolved, Friedel-Crafts type, catalyst such as aluminum chloride, aluminum bromide, titanium tetrachloride, boron trifluoride, uranium chloride and the like, dissolved in a low-freezing, inert or non-complex forming solvent, such as ethyl or methyl chloride, or carbon disulfide, or the like. The catalyst solution preferably contains from 0.1% to 5% of a dissolved active metal halide catalyst and is preferably used in the ratio of about 10 parts per 100 parts of the diolefin. The polymerization proceeds promptly with the development of a substantial amount of heat and the production of a polymer in solution without the formation of insoluble gel.

The products so obtained are suitable as film-forming agents, varnishes and the like, and have superior baked-film properties.

The following examples are given as illustrative of the invention, but it is to be understood as not limitative of the scope thereof.

*Example I*

A mixture of 50 parts butadiene, 25 parts diisobutylene and 25 parts chlorobenzene was diluted with one volume of methyl chloride and treated with AlCl₃ ethyl chloride catalyst (2.0 g./100 cc.). When the reaction mixture became highly viscous it was quenched in naphtha and the low boiling constituents allowed to weather off. After thorough water washing the dry resin was recovered by flashing off the naphtha and any unchanged chlorobenzene. A yield of 60 parts of brittle, clear resin was obtained which showed an excellent reactivity toward linseed oil and gave a varnish with superior grease resistance.

*Example II*

A similar experiment to that described in Example I was run except that a feed of 50 parts butadiene, 25 parts diisobutylene and 25 parts anisole was used. A product was obtained in good yield.

Example III

A butadiene-isobutylene-toluene feed containing a 60-20-20 ratio of monomers was diluted with methyl chloride and treated with AlCl₃ ethyl chloride catalyst under reflux. A yield of 64% of soft product, based on total feed, was obtained at a catalyst efficiency of 74 g./g. The bodying time for a 15 gallon linseed oil varnish was 4¾ hours at 560° F. and the air dried and baked varnish film properties were found to be superior to those made from a copolymer of butadiene-isobutylene alone prepared in the same manner.

| Test | Copolymer of Butadiene-Isobutylene | | Tripolymer of Butadiene-Isobutylene-Toluene | |
|---|---|---|---|---|
| | Air-Dried | Baked | Air-Dried | Baked |
| Hardness | 6 | 0 | 0 | 0 |
| Water Resistance | 7 | 0 | 0 | 0 |
| Grease Resistance | 8 | 5 | 5 | 0 |
| Caustic Resistance | 9 | 9 | 4 | 0 |
| Flex Resistance | 0 | 0 | 0 | 0 |
| Soap Resistance | 9 | 0 | 0 | 0 |

0=unaffected; 9=complete failure.

Example IV

A series of butadiene-isobutylene-benzene polymers was prepared which indicated that the physical characteristics of the polymer varied between a soft, penetrable product to a hard, brittle resin depending upon the ratio of monomers in the feed. The results are shown below:

| Butadiene in Feed (Parts) | 28.7 | 44.6 | 54.7 | 61.6 | 53.2 | 40.8 | 32. |
|---|---|---|---|---|---|---|---|
| Isobutylene in Feed (Parts) | 29.8 | 23.1 | 18.9 | 16 | 27 | 20.5 | 16. |
| Benzene in Feed (Parts) | 41.5 | 32.2 | 26.4 | 22.4 | 19.2 | 38.8 | 52. |
| Percent yield on Total Feed | 56 | 55 | 54 | 36 | 50 | 58 | 51. |
| Percent yield on Olefins | 96 | 81 | 73 | 47 | 62 | 95 | 105. |
| Catalyst Efficiency | 62 | 106 | 175 | 132 | 132 | 38 | 28. |
| Product State | Soft | Soft | Soft | Soft | Soft | Hard | Hard. |
| Softening Point, °C | 42 | 58 | 58.5 | | | Gelled | 81.5 |

Example V

A 5-liter 3-way flask fitted with a mercury sealed mechanical stirrer, Dry Ice cooled reflux condenser, catalyst delivery funnel and thermometer was charged with the following:

414 g. butadiene (vapor passed over CaCl₂ and condensed)
338 g. diisobutylene (close cut)
188 g. phenol
552 cc. methyl chloride A solution of AlCl₃ in ethyl chloride containing 7.63 g. AlCl₃/100 cc. of ethyl chloride was added to the above agitated solution in increments. A total of 125.1 g. of AlCl₃ was added. The catalyst was then quenched with isopropyl alcohol, the methyl chloride and ethyl chloride was allowed to flash off and the product was then heated to 450° F. to drive off solvents and any remaining phenol not removed by water washing. The final product which was dark in color and fluid amounted to 365 g. This corresponds to a 39% yield based on the total feed or 49% based on the olefins. The yield of product could be increased considerably if a sufficient amount of AlCl₃ was used to form the dichloro aluminum phenate.

Example VI

A 5-liter 3-way flask fitted with a mechanical stirrer, Dry Ice cooled reflux condenser, thermometer and catalyst delivery funnel was charged with the following:

1,3-butadiene _____ g__ 488
Propylene (95%) _____ g__ 262
Toluene (Bakers) _____ g__ 188
Methyl chloride _____ cc__ 522

To the above charge was then added AlCl₃ dissolved in ethyl chloride, concentration being 3.92 g. AlCl₃/100 cc. of ethyl chloride. A total of 300 cc. of catalyst solution was introduced in increments over a period of 90 minutes. The reaction temperature was −27 to −18° C. At the end of 97 minutes the catalyst was quenched with isopropyl alcohol. The polymer solution was diluted with 500 cc. of 54° naphtha. Methyl and ethyl chlorides were allowed to weather off at room temperature. The polymer solution was freed of catalyst residues by water washing. The solvents were stripped from the polymer by heating to 450° F. A total of 522 g. of soft, light amber colored polymer was obtained, corresponding to a conversion of 56%. The product had an iodine number of 162.7. In a similar manner polymers were prepared from butadiene-propylene-toluene feed ratios of 43.4/23.3/33.3 and 56.6/30.4/13 respectively. Polymer yields of 58.5 and 44.6% were obtained for the above feed ratios respectively. The properties of linseed oil varnishes of these polymers are summarized in the following table:

| Ratio, Diolefin/Olefin/Aromatic | Catalyst, Percent on Feed | Polymer Yield, Percent | Properties | | Varnish Preparation, 15 gal. length | | | | | Varnish Film Properties | | | | | | |
|---|---|---|---|---|---|---|---|---|---|---|---|---|---|---|---|---|
| | | | Softening Point, °C | I₂# | Cook Time | | Base Loss, Percent | Gardner | | Reduced Cure | | H | W | G | C | F | S |
| | | | | | Hrs. | Min. | | Color | Vis. | | | | | | | |
| 52/27.9/20.1 | 1.253 | 56 | Soft | 162.7 | 3 | :30 | 10.6 | 10-11 | L-M | 34 | A | 0 | 2 | 1 | 0 | 0 | 4 |
| | | | | | | | | | | | B | 0 | 0 | 0 | 0 | 0 | 0 |
| 43.4/23.3/33.3 | 2.09 | 58.5 | do | 130.4 | 3 | :45 | 13.6 | 16-17 | J-K | 39 | A | 0 | 1 | 7 | 0 | 0 | 3 |
| | | | | | | | | | | | B | 0 | 0 | 0 | 0 | 0 | 0 |
| 56.6/39.4/13 | 0.633 | 44.6 | do | 201.6 | 1 | :38 | 3.03 | 8-9 | J | 40 | A | 0 | 6 | 7 | 6 | 0 | 6 |
| | | | | | | | | | | | B | 0 | 0 | 0 | 3 | 0 | 0 |
| 55/45/0 | | 29 | | 165 | (b) | | | 10-11 | S-T | | A | 1 | 7 | 5 | 9 | 6 | 7 |
| | | | | | | | | | | | B | 0 | 0 | 0 | 6 | 0 | 6 |

A—air dried film; B—baked film.
H—hardness; W—water resistance; G—grease resistance; C—caustic resistance; F—flex; S—soap resistance.
ᵇ Varnishes formed by the time temp. reached 560° F.

Example VII

A sample of a copolymer of butadiene and acrylonitrile containing 26% acrylonitrile (100 parts) was placed on the cold mill and a total of 20 parts of the phenol alkylate described in Example V was added. A very clear, smooth sheet was obtained. A control sample was similarly treated and 20 parts of dibutyl phthalate was added. Standard Perbunan compounds were made up and cured at 287° F. for 15, 30, 45 and 90 minutes. The tensile-elongation data as well as percent swell in SR-6 after 48 hours are shown below:

| Cure Time at 287° F., Min. | Dibutyl Phthalate Plasticizer | | | Alkylated Phenol Plasticizer | | |
|---|---|---|---|---|---|---|
| | Tensile, #/Sq. In. | Elongation, Percent | Swell, Percent | Tensile, #/Sq. In. | Elongation, Percent | Swell, Percent |
| 15 | 2,140 | 190 | 43.7 | 2,840 | 280 | -------- |
| 30 | 2,420 | 200 | 48.0 | 2,710 | 270 | 53.9 |
| 45 | 2,510 | 190 | 47.4 | 2,590 | 270 | 50.5 |
| 90 | 2,610 | 200 | 49.5 | 2,850 | 270 | 55.1 |

Compound recipe:
```
Polymer ------------------------------ 100
Carbon Black ------------------------- 45
Zinc oxide --------------------------- 5
Stearic acid ------------------------- 1
Dibutyl phthalate -------------------- 15
Altax -------------------------------- 1
Sulfur ------------------------------- 1.5
Diphenylguanidine -------------------- .5
```

It is apparent that the alkylated phenol was superior to the conventional plasticizer in that it gave a faster curing stock which showed higher elongation, higher tensile strength and less extraction by an aromatic solvent.

Example VIII

One part of a butadiene-diisobutylene-phenol resin (obtained as in Example V) and 1.2 parts of alkali refined linseed oil (15 gallon length varnish) were heated for 1 hour at 565° F. A varnish of 18+ Gardner color and x-6 Gardner viscosity was obtained. The air dried and baked film properties of this varnish are compared with those of a varnish prepared from a butadiene-diisobutylene resin and linseed oil.

| Test | Butadiene-Diisobutylene Resin-Linseed Oil Varnish | | Butadiene-Diisobutylene-Phenol Resin-Linseed Oil Varnish | |
|---|---|---|---|---|
| | Air Dried Film | Baked Film | Air Dried Film | Baked Film |
| Hardness | 4 | 4 | 6 | 4 |
| Water Resistance | 0 | 0 | 0 | 0 |
| Grease Resistance | 7 | 0 | 8 | 0 |
| 1% NaOH Resistance | 4 | 4 | 2 | 0 |
| Flex Resistance | 0 | 0 | 0 | 0 |
| Soap Resistance | 0 | 0 | 2 | 0 |

Rating: 0=unaffected; 9=film failure.

While in the above examples specific reaction conditions are given, the present invention is not limited to such conditions. For example, variations may be introduced as to the particular diolefin, olefin and aromatic hydrocarbon conjointly polymerized; the relative proportions of said unsaturated materials; dilution of the reaction mix; etc., without departing from the essence of the invention. Of course, as is evident to one skilled in the art, variations relating to the reactants per se will be accompanied by a certain degree of alteration of the physical properties of the final product. Thus, it may be desirable to relate the concentration of the individual components and their period of polymerization to the rates of polymerization of the individual substances as a means of controlling the composition of the final product. Furthermore, since the aromatic hydrocarbons and the diolefins polymerize more readily than do the olefins, the ultimate composition of the products lends itself to control by this means. Generally, however, it is desirable to carry out this reaction so that substantial amounts of the olefins enter into the final polymerization products.

It is not possible at this time to state the mechanism of this invention, nor is the invention limited to any theories as to the process of the reaction.

The nature of the present invention having thus been described, what is claimed as new and useful and desired to be secured by Letters Patent is:

We claim:

1. A process for the preparation of a resinous polymer which comprises mixing butadiene, isobutylene and toluene in a ratio of 60/20/20, diluting the mixture with methyl chloride, cooling the diluted solution to a temperature between 0° C. and −40° C., adding thereto 10% by weight based on the feed of aluminum chloride catalyst dissolved in ethyl chloride in a concentration between 0.1 and 5% and separating the resulting resin from the reaction mixture.

2. A process for the preparation of a resinous polymer which comprises mixing 28.7 to 68.6% of butadiene, 16 to 36% of an olefin selected from the group consisting of diisobutylene, isobutylene, and propylene, and 19 to 52% of an aromatic compound selected from the group consisting of chlorobenzene, anisole, toluene, benzene, and phenol, said aromatic compound not being in excess of 52 wt. per cent of the monomeric mixture, diluting the mixture with methyl chloride, cooling the diluted solution to a temperature between 0° C. and −40° C., adding thereto 10% by weigh based on the feed of an aluminum chloride catalyst dissolved in ethyl chloride in a concentration between 0.1 and 5%, and separating the resulting resin from the mixture.

3. A process according to claim 2 in which the olefin is isobutylene.

4. A process according to claim 3 in which the aromatic compound is toluene.

5. A process according to claim 2 in which the olefin is propylene.

6. A process according to claim 5 in which the aromatic compound is toluene.

7. A process according to claim 2 in which the aromatic compound is chlorobenzene.

8. A process according to claim 7 in which the olefin is diisobutylene.

9. A process according to claim 2 in which the diolefin is butadiene.

10. A process according to claim 9 in which the olefin is isobutylene.

11. A process according to claim 10 in which the aromatic compound is benzene.

12. A process according to claim 2 in which the olefin is diisobutylene.

13. A process according to claim 12 in which the aromatic compound is anisole.

14. A composition comprising a copolymer of butadiene, an olefin selected from the group consisting of diisobutylene, isobutylene, and propylene, and an aromatic compound selected from the group consisting of chlorobenzene, anisole, toluene, benzene, and phenol, said aromatic compound not being in excess of 52 wt. per cent of monomeric mixture, said copolymer being dissolved in linseed oil and being prepared by the application at a temperature below 0° C. of aluminum chloride dissolved in ethyl chloride in a concentration between 0.1 and 5% to a feed consisting of between 28.7–61.6% butadiene, 16–36% of olefin and 19–52% of the aromatic.

15. A process for the preparation of a resinous polymer which comprises mixing butadiene, isobutylene and benzene in a ratio of 32/16/52, diluting the mixture with methyl chloride, cooling the diluted solution to a temperature between 0° C. and −40° C., adding thereto an aluminum chloride catalyst dissolved in methyl chloride in a concentration between 0.1 and 5% and separating the resulting resin from the reaction mixture.

References Cited in the file of this patent

UNITED STATES PATENTS

| Number | Name | Date |
|---|---|---|
| 2,438,340 | Johnson | Mar. 23, 1948 |
| 2,476,000 | Sparks et al. | July 12, 1949 |
| 2,476,064 | Ritz et al. | July 12, 1949 |
| 2,479,450 | Young et al. | Aug. 16, 1949 |
| 2,497,458 | Kurtz, Jr. | Feb. 14, 1950 |
| 2,583,420 | Garber et al. | Jan. 22, 1952 |

FOREIGN PATENTS

| Number | Country | Date |
|---|---|---|
| 106,371 | Australia | Jan. 26, 1939 |
| 516,931 | Great Britain | Jan. 16, 1940 |